US011375855B2

(12) United States Patent
Wilson et al.

(10) Patent No.: US 11,375,855 B2
(45) Date of Patent: Jul. 5, 2022

(54) EMBOSSED PATTERN ON SINGLE-USE DISPOSABLE CUTTING BOARD TO CREATE SLIDE-RESISTANCE

(71) Applicant: The Tradewell Group, Inc., Naples, FL (US)

(72) Inventors: Gary Michael Wilson, Naples, FL (US); Joseph Richard Cant, Naples, FL (US)

(73) Assignee: The Tradewell Group, Inc., Naples, FL (US)

( * ) Notice: Subject to any disclaimer, the term of this patent is extended or adjusted under 35 U.S.C. 154(b) by 0 days.

(21) Appl. No.: 17/214,576

(22) Filed: Mar. 26, 2021

(65) Prior Publication Data

US 2021/0298535 A1 Sep. 30, 2021

Related U.S. Application Data

(60) Provisional application No. 63/000,019, filed on Mar. 26, 2020.

(51) Int. Cl.
*A47J 47/00* (2006.01)

(52) U.S. Cl.
CPC .................. *A47J 47/005* (2013.01)

(58) Field of Classification Search
CPC ......... A47J 47/005; A47J 47/14; A47J 47/16; A47J 47/20
(Continued)

(56) References Cited

U.S. PATENT DOCUMENTS

| | | |
|---|---|---|
| 1,212,040 A | 1/1917 | Fletcher |
| 1,922,399 A | 8/1933 | Schilling |

(Continued)

FOREIGN PATENT DOCUMENTS

| | | |
|---|---|---|
| FR | 2 646 766 A1 | 11/1970 |
| FR | 2646766 A1 | 11/1990 |

(Continued)

OTHER PUBLICATIONS

English language abstract for FR 2 646 766 A1 extracted from espacenet.com database on Apr. 21, 2021, 1 page.

(Continued)

*Primary Examiner* — Lee D Wilson
*Assistant Examiner* — Robert F Neibaur
(74) *Attorney, Agent, or Firm* — Howard & Howard Attorneys PLLC

(57) ABSTRACT

This disclosure relates to a disposable cutting board assembly. The assembly includes a homogenous sheet of cut-resistant paper material having an inner cutting area. A plurality of peripheral outer borders and a plurality of corners extend from said inner cutting area to an endless exterior edge. The inner cutting area, said outer borders and said corners each have a top surface and a bottom surface. A coating of plastic is disposed on said top surface of said inner cutting area, said outer borders and said corners of said homogeneous sheet of paper material. The coating of plastic provides a sterile durable surface to prevent liquid absorption into said sheet of paper material and reduces cross contamination. An embossed pattern is within said inner cutting area. The embossed pattern includes plurality of embossed lines that intersect to form a plurality of repeating geometric shapes. Each of the plurality of repeating geometric shapes include at least one acute angle. A depressed area is within each of the repeating geometric shapes. The depressed area prevents liquid overflow. Each of the plurality of embossed lines has opposing sides that are parallel to each other and extend to a flat top, or has opposing sides that are transverse to each other.

18 Claims, 12 Drawing Sheets

(58) Field of Classification Search
USPC .......................................... 269/289 R, 302.1
See application file for complete search history.

(56) References Cited

U.S. PATENT DOCUMENTS

| | | | |
|---|---|---|---|
| 1,952,375 | A | 3/1934 | Johnson |
| 3,385,357 | A | 5/1968 | Burg |
| 4,100,676 | A | 7/1978 | Ferguson |
| 4,116,426 | A | 9/1978 | Kessler |
| 4,719,913 | A | 1/1988 | Merwin |
| 4,930,759 | A | 6/1990 | Potter et al. |
| 5,085,416 | A | 2/1992 | Miyake et al. |
| 5,203,548 | A | 4/1993 | Sanders |
| 5,217,159 | A | 6/1993 | Calvert et al. |
| 5,368,910 | A | 11/1994 | Langdon |
| 5,386,978 | A | 2/1995 | Ladwig |
| 5,405,043 | A | 4/1995 | Meloney |
| D363,196 | S | 10/1995 | Kristiansen |
| 5,472,790 | A | 12/1995 | Thompson |
| D366,400 | S | 1/1996 | Dentsbier |
| D368,834 | S | 4/1996 | Lillelund et al. |
| 5,597,104 | A | 1/1997 | Elliott |
| 5,645,933 | A | 7/1997 | Sakazume et al. |
| 5,727,686 | A | 3/1998 | Kristal |
| 6,164,478 | A | 12/2000 | Cant |
| D441,261 | S | 5/2001 | Stein |
| 6,274,232 | B1 | 8/2001 | Otten et al. |
| 6,422,551 | B1 | 7/2002 | Brotz |
| 6,460,841 | B1 | 10/2002 | Durr |
| D475,625 | S | 6/2003 | Lin |
| D475,856 | S | 6/2003 | Karul et al. |
| 6,695,299 | B1 | 2/2004 | Brotz |
| 6,889,969 | B2 | 5/2005 | Diermeier et al. |
| 6,913,255 | B2 | 7/2005 | Porchia et al. |
| 6,994,335 | B2 | 2/2006 | Porchia et al. |
| 7,022,395 | B2 | 4/2006 | Ackerman et al. |
| 7,056,569 | B2 * | 6/2006 | Price .................. A47J 47/005 269/289 R |
| D540,039 | S | 4/2007 | van Beuningen |
| 7,208,216 | B2 | 4/2007 | Ackerman et al. |
| D562,090 | S | 2/2008 | Goldman |
| D570,154 | S | 6/2008 | Wang |
| D581,120 | S | 11/2008 | Sofy et al. |
| 7,975,396 | B2 | 7/2011 | Mastroianni |
| 8,141,860 | B2 | 3/2012 | Goldman |
| 8,251,357 | B2 | 8/2012 | Young |
| D669,685 | S | 10/2012 | Legreca et al. |
| D690,566 | S | 10/2013 | Bernheim |
| D691,863 | S | 10/2013 | Zirinsky et al. |
| D697,757 | S | 1/2014 | Xin |
| D699,083 | S | 2/2014 | Hasegawa |
| D699,524 | S | 2/2014 | Hasegawa |
| 8,690,133 | B1 | 4/2014 | Hauser |
| D718,989 | S | 12/2014 | Hoffstadt |
| D728,991 | S | 5/2015 | Hasegawa |
| 9,227,006 | B2 | 1/2016 | Cant et al. |
| 9,687,113 | B2 | 6/2017 | Torlai et al. |
| D803,641 | S | 11/2017 | Chen |
| D826,011 | S | 8/2018 | Heinlein et al. |
| D831,442 | S | 10/2018 | Proctor |
| D844,400 | S | 4/2019 | Evans |
| 10,349,783 | B2 | 7/2019 | Humphreys et al. |
| 10,448,788 | B1 | 10/2019 | Milhiser |
| D880,259 | S | 4/2020 | Zhang |
| 10,617,262 | B2 | 4/2020 | Eckholm et al. |
| 10,765,264 | B2 | 9/2020 | Littlejohn et al. |
| 2003/0097915 | A1 | 5/2003 | Chen et al. |
| 2004/0157040 | A1 | 8/2004 | Ackerman et al. |
| 2004/0192133 | A1 | 9/2004 | Kim et al. |
| 2005/0082732 | A1 | 4/2005 | Chang |
| 2005/0202208 | A1 | 9/2005 | Kelly |
| 2005/0253320 | A1 | 11/2005 | Chang |
| 2006/0208410 | A1 | 9/2006 | McRorie |
| 2007/0065680 | A1 | 3/2007 | Schultheis et al. |
| 2010/0187741 | A1 | 7/2010 | Fischer |
| 2011/0089622 | A1 | 4/2011 | Ji |
| 2014/0252709 | A1 | 9/2014 | Crimmins |
| 2015/0306802 | A1 | 10/2015 | Thoma |
| 2016/0150916 | A1 | 6/2016 | McNally et al. |
| 2017/0042382 | A1 | 2/2017 | Gromus |
| 2017/0265688 | A1 | 9/2017 | Singh |
| 2017/0340172 | A1 | 11/2017 | Hsieh |
| 2018/0310774 | A1 | 11/2018 | Dwork |
| 2019/0133381 | A1 | 5/2019 | Auerbach |
| 2020/0062521 | A1 * | 2/2020 | Lyon .................. B65H 3/50 |
| 2020/0122873 | A1 * | 4/2020 | Agerton .............. B65D 1/0215 |
| 2020/0315404 | A1 | 10/2020 | Altheimer |
| 2020/0315405 | A1 | 10/2020 | Fiola |

FOREIGN PATENT DOCUMENTS

| | | |
|---|---|---|
| JP | S56-4617 A | 1/1981 |
| JP | S564617 A | 1/1981 |
| KR | 20150026141 A | 3/2015 |
| WO | 0126524 A1 | 4/2001 |
| WO | 2006133705 A1 | 12/2006 |
| WO | 2017045183 A1 | 3/2017 |
| WO | WO 2017/045183 A1 | 3/2017 |

OTHER PUBLICATIONS

English language abstract for JPS 56-4617 A extracted from espacenet.com database on Apr. 21, 2021, 1 page.
English language abstract for KR 20150026141 A extracted from espacenet.com database on Apr. 21, 2021, 1 page.
English language abstract for WO 2017/045183 A1 extracted from espacenet.com database on Apr. 21, 2021, 1 page.

* cited by examiner

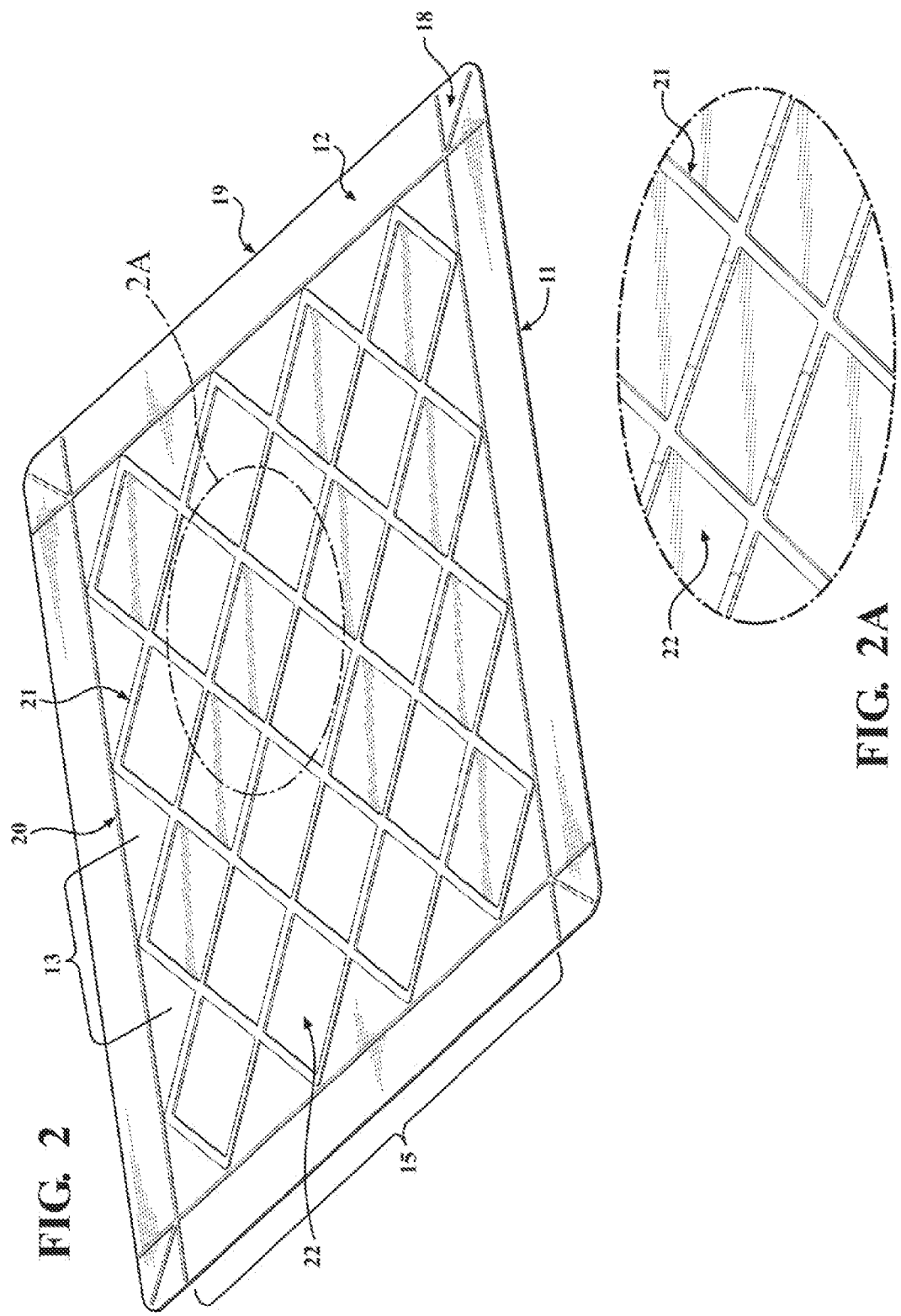

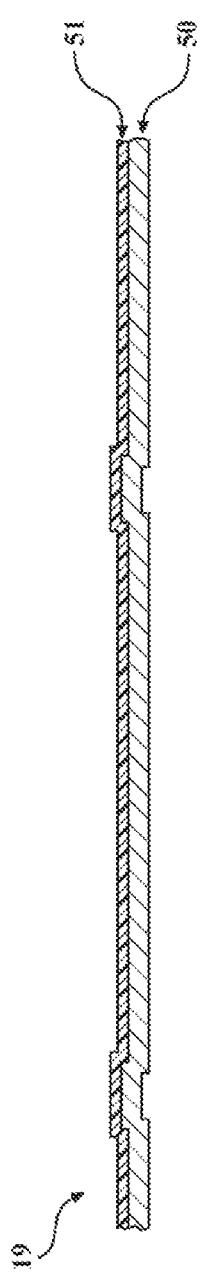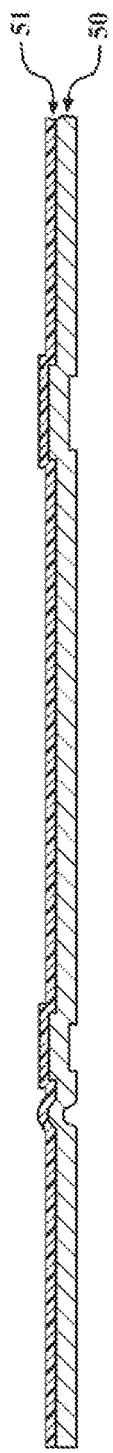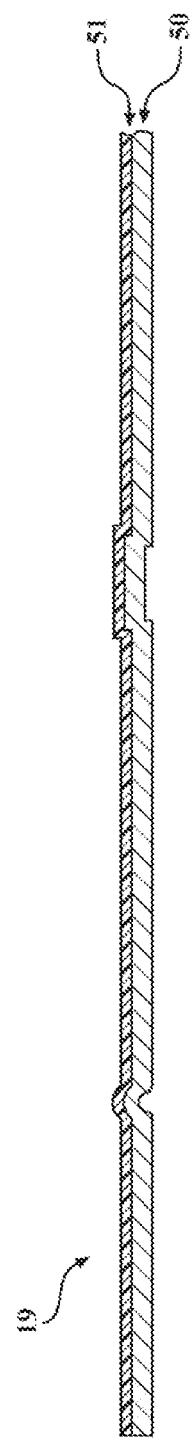

EMBOSSED PATTERN ON SINGLE-USE DISPOSABLE CUTTING BOARD TO CREATE SLIDE-RESISTANCE

BACKGROUND

1. Field of Invention

The subject invention relates to a single-use disposable cutting board made from Solid Bleached Sulfate (SBS) paperboard and, more specifically, to raised (embossed) lines on the cutting surface area arranged in various geometric patterns all of which employ converging shaped sides that create exponential horizontal left/right, up/down and vertical top/down slide-resistance of items placed on the cutting surface.

2. Description of Related Art

Cutting boards are used in a variety of settings including, but not limited to, home kitchens, restaurant kitchens, medical laboratories and surgical rooms. For user-safety and better cutting control, it is important that items being cut on the surface of any cutting surface remain in place and do not slide around during cutting. Current single-use SBS paperboard cutting boards have a smooth and glossy polyethylene coated surface which provides no 'friction points' on the surface to help keep items being cut in place. In the production of the SBS paperboard the polyethylene is extruded in a molten state as the large paper rolls travel through the machinery that coats, dries and re-rolls the coated paperboard at the other end of the coating machinery. The finished polyethylene coated SBS paperboard roll is then shipped to a converting operation that die-cuts the paperboard into single-use disposable cutting boards.

Accordingly, single-use disposable cutting boards made from heavy-duty Solid Bleached Sulfate paperboard and coated with extruded polyethylene have been developed. A suitable disposable cutting board 19 is disclosed in U.S. Pat. No. 6,164,478 (now expired), assigned to The Tradewell Group, Inc. and invented and assigned by Joseph R. Cant and Gary M. Wilson, who are the co-inventors of this augmentation to the above referenced patent. Mr. Cant's patented invention employs scored edges that give the user the option of folding the edges up to contain cuttings and fluids, however, the subject patent does not provide for any surface slip-resistance via the embossed geometric shapes described herein.

SUMMARY OF THE DISCLOSURE AND ADVANTAGES

This disclosure provides a disposable cutting board assembly. In one embodiment, the assembly includes a homogenous sheet of cut-resistant paper material having an inner cutting area. A plurality of peripheral outer borders and a plurality of corners extend from said inner cutting area to an endless exterior edge. The inner cutting area, said outer borders and said corners each have a top surface and a bottom surface. A coating of plastic is disposed on said top surface of said inner cutting area, said outer borders and said corners of said homogeneous sheet of paper material. The coating of plastic provides a sterile durable surface to prevent liquid absorption into said sheet of paper material and reduces cross contamination. An embossed pattern is within said inner cutting area. The embossed pattern includes plurality of embossed lines that intersect to form a plurality of repeating geometric shapes. Each of the plurality of repeating geometric shapes include at least one acute angle. A depressed area is within each of the repeating geometric shapes. The depressed area prevents liquid overflow. Each of the plurality of embossed lines has opposing sides that are parallel to each other and extend to a flat top.

In another embodiment, the assembly includes a homogenous sheet of cut-resistant paper material having an inner cutting area. A plurality of peripheral outer borders and a plurality of corners extend from said inner cutting area to an endless exterior edge. The inner cutting area, said outer borders and said corners each have a top surface and a bottom surface. A coating of plastic is disposed on said top surface of said inner cutting area, said outer borders and said corners of said homogeneous sheet of paper material. The coating of plastic provides a sterile durable surface to prevent liquid absorption into said sheet of paper material and reduces cross contamination. An embossed pattern is within said inner cutting area. The embossed pattern includes plurality of embossed lines that intersect to form a plurality of repeating geometric shapes. Each of the plurality of repeating geometric shapes include at least one acute angle. A depressed area is within each of the repeating geometric shapes. The depressed area prevents liquid overflow. Each of the plurality of embossed lines has opposing sides that are transverse to each other.

The disposable cutting board assembly having embossed lines and angles within the geometric shapes resulting in decreasing dimensions within the geometric shapes provides increased side-to-side slide resistance and up-and-down slide resistance of an item, such as meat, fish or poultry, being cut on the disposable cutting board assembly.

BRIEF DESCRIPTION OF THE DRAWINGS

Advantages of the disclosure will be readily appreciated, as the same becomes better understood by reference to the following detailed description when considered in connection with the accompanying drawings wherein:

FIG. 2 shows an angled view of FIG. 1A showing the raised formation of the embossed lines 21 and an enclosed depressed area 22 inside geometric shapes 13.

FIG. 2A shows a magnified segment of the board 19 shown in FIG. 2. The embossed lines 21 are shown as having sharply angled side-to-top edges.

FIG. 11 shows a cross-sectional view of an embodiment of the disposable cutting board taken along lines 11-11 of FIG. 10, showing the paper 50 of the inner cutting area of the disposable cutting board 19 having a coating of plastic 51 thereon.

FIG. 12 shows a cross-sectional view of an embodiment of the disposable cutting board taken along lines 12-12 of FIG. 10, showing the paper 50 of the inner cutting area of the disposable cutting board 19 having a coating of plastic 51 thereon.

FIG. 13 shows a cross-sectional view of an embodiment of the disposable cutting board taken along lines 13-13 of FIG. 10, showing the paper 50 of the inner cutting area of the disposable cutting board 19 having a coating of plastic 51 thereon.

DETAILED DESCRIPTION OF THE DISCLOSURE

Referring to FIG. 1, wherein like numerals indicate corresponding parts throughout the view, a disposable cutting board is shown generally as 19. The disposable cutting board 19 may be formed from a homogenous sheet of Solid Bleached Sulfate paperboard material with typical thicknesses ranging from a minimum of 0.011" to 0.036". The material is semi-rigid, yet flexible and possesses cut-through resistance.

Figure 1A:
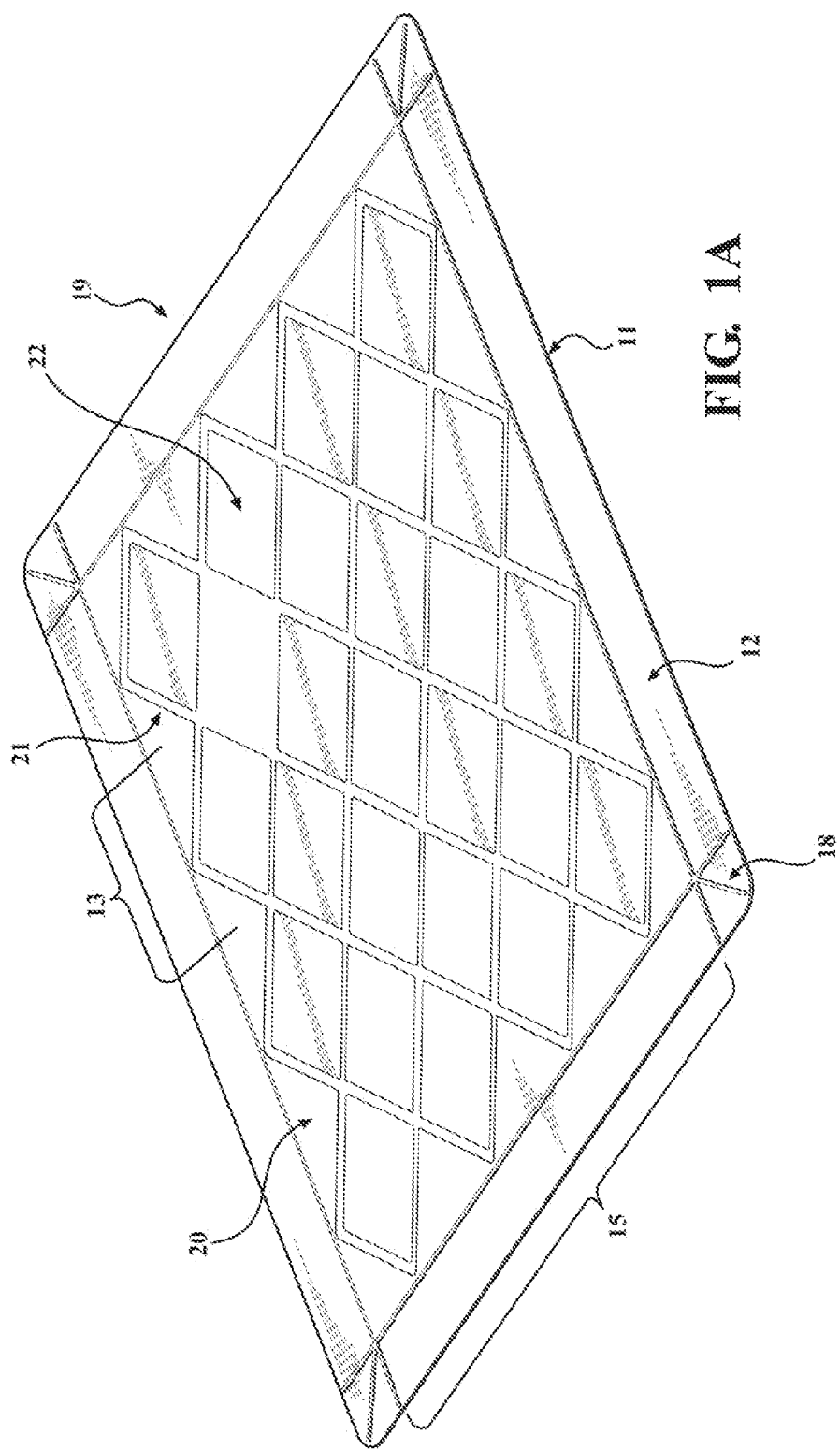
FIG. 1A shows an embodiment of the disclosure in which the disposable cutting board 19 and the peripheral lines 20 are shown for folding up the edges 11. The top, working surface of the disposable cutting board 19 is shown. It also shows an embossed pattern of a plurality of embossed lines 21 in geometric shapes 13 that creates increasing slip resistance due to the decreasing distance between the opposing embossed lines 21 in the geometric shapes 13. The enclosed depressed area 22 inside the embossed lines 21 also provides for passive fluid containment.
Figure 1B:
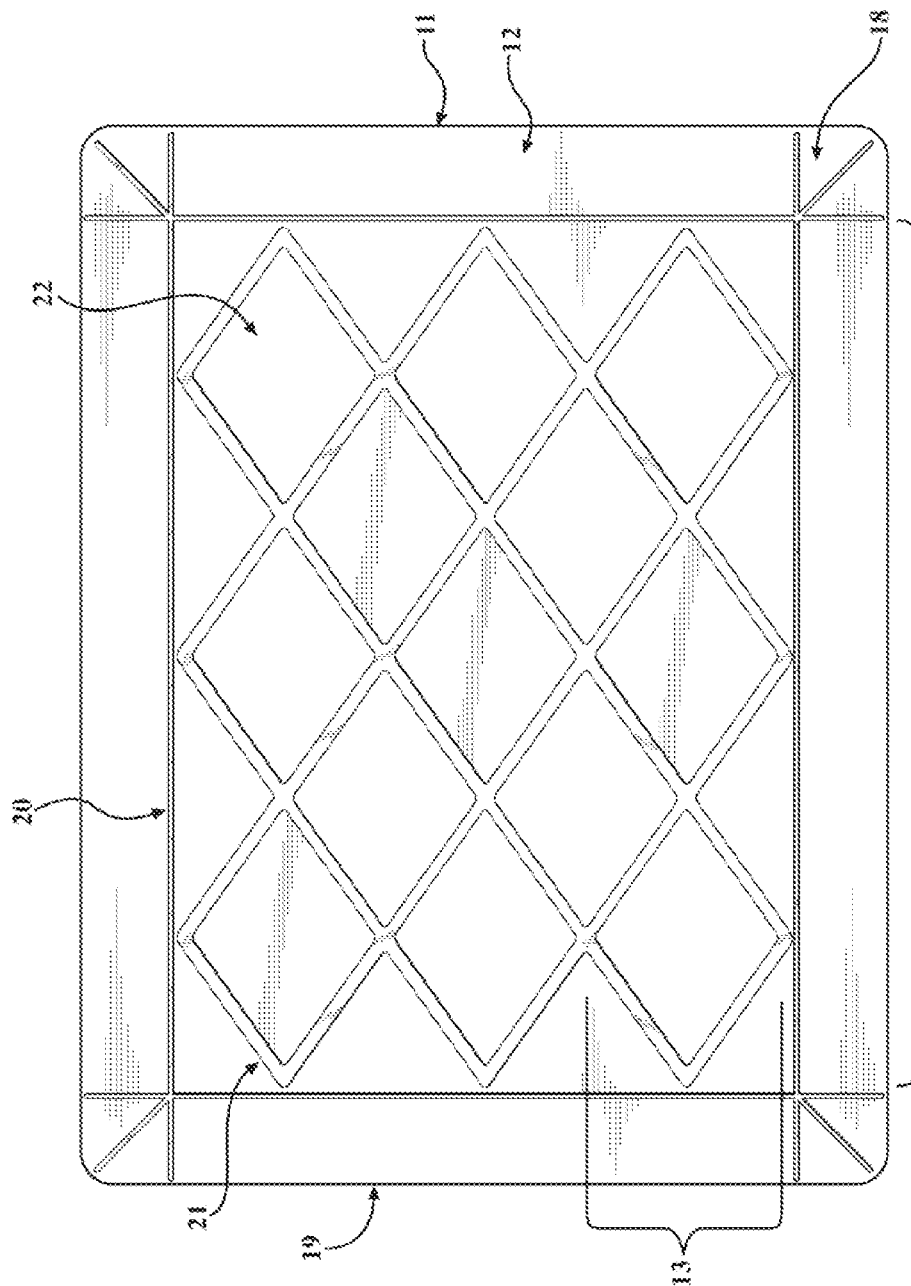
FIG. 1B shows an another embodiment of a disposable cutting board 19 having different geometric shapes 13 than FIG. 1A. An aerial view of the top, working surface is shown, having an embossed pattern where a plurality of embossed lines 21 and peripheral lines 20 are shown as raised.
Figure 3A:
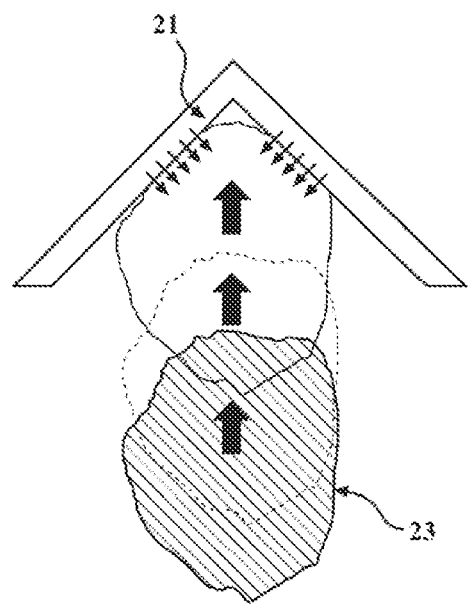
FIGS. 3A-3D illustrates how the pattern of the embossed lines 21 creates increased slide-resistance in any of four separate horizontal directions of an item on the cutting board 23 as the item is pushed into the decreasing dimensions inside the pattern's opposing embossed lines 21 that can be configured in a multitude of geometric shapes and sizes that employ a raised/embossed pattern.
Figure 3B:
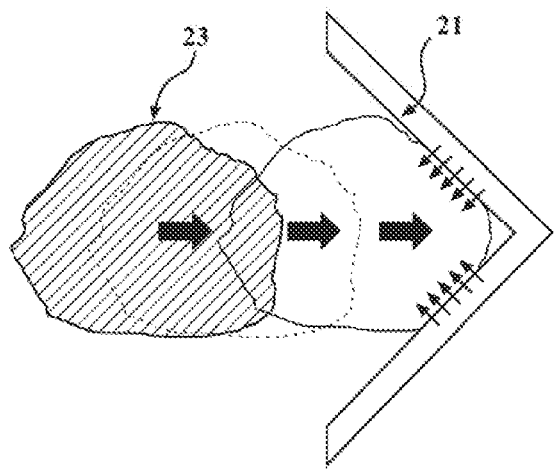
Figure 3C:
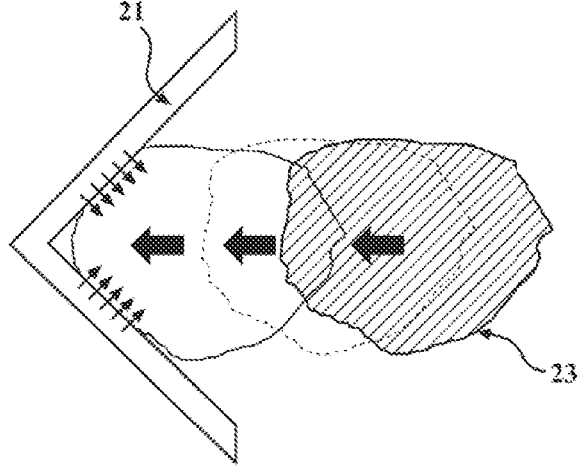
Figure 3D:
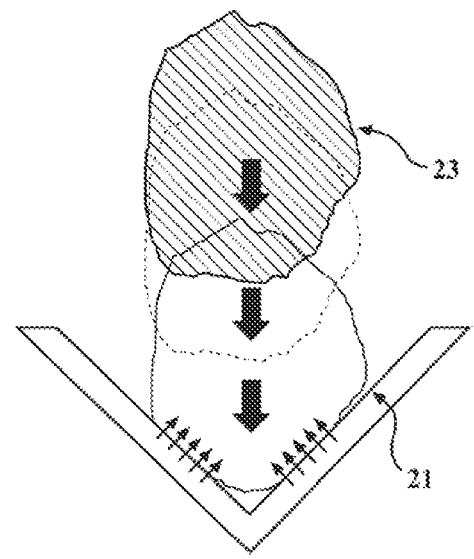

As best shown in FIGS. 1A and 1B, the cutting board assembly 19 comprises an inner cutting area or surface 15, a plurality of peripheral outer borders 12 each including an endless exterior edge 11, and a plurality of corners 18. A plurality of peripheral lines 20 separate at least a portion of the outer borders 12 from the inner cutting area or surface 15. The plurality of peripheral outer borders 12 and plurality of corners 18 extend from the inner cutting area 15 to the exterior edge 11. The assembly 19 is characterized by an embossed pattern within said inner cutting area 15, wherein the embossed pattern includes a plurality of embossed lines 21 that intersect to form a plurality of repeating geometric shapes, each of said plurality of repeating geometric shapes including at least one acute angle.

The inner cutting area or surface 15 may be substantially rectangular in shape. In certain embodiments, the inner cutting area 15 is rectangular in shape. In other embodiments, the inner cutting area 15 may be substantially square in shape or square in shape.

The embossed pattern is a concave, raised pattern on the inner surface of the cutting board assembly. The embossed pattern includes a plurality of embossed lines 21. The embossed lines may include two sets of parallel lines. Parallel lines in each set may be evenly spaced apart. The parallel lines in one set intersect the parallel line in the other set, as shown in FIGS. 1A, 1B, 2, 6 and 14. The intersection of the parallel lines form the plurality of repeating geometric shapes 13. The parallel lines intersect in such a way as to create at least one acute angle in each of the plurality of geometric shapes 13.

Figure 14:
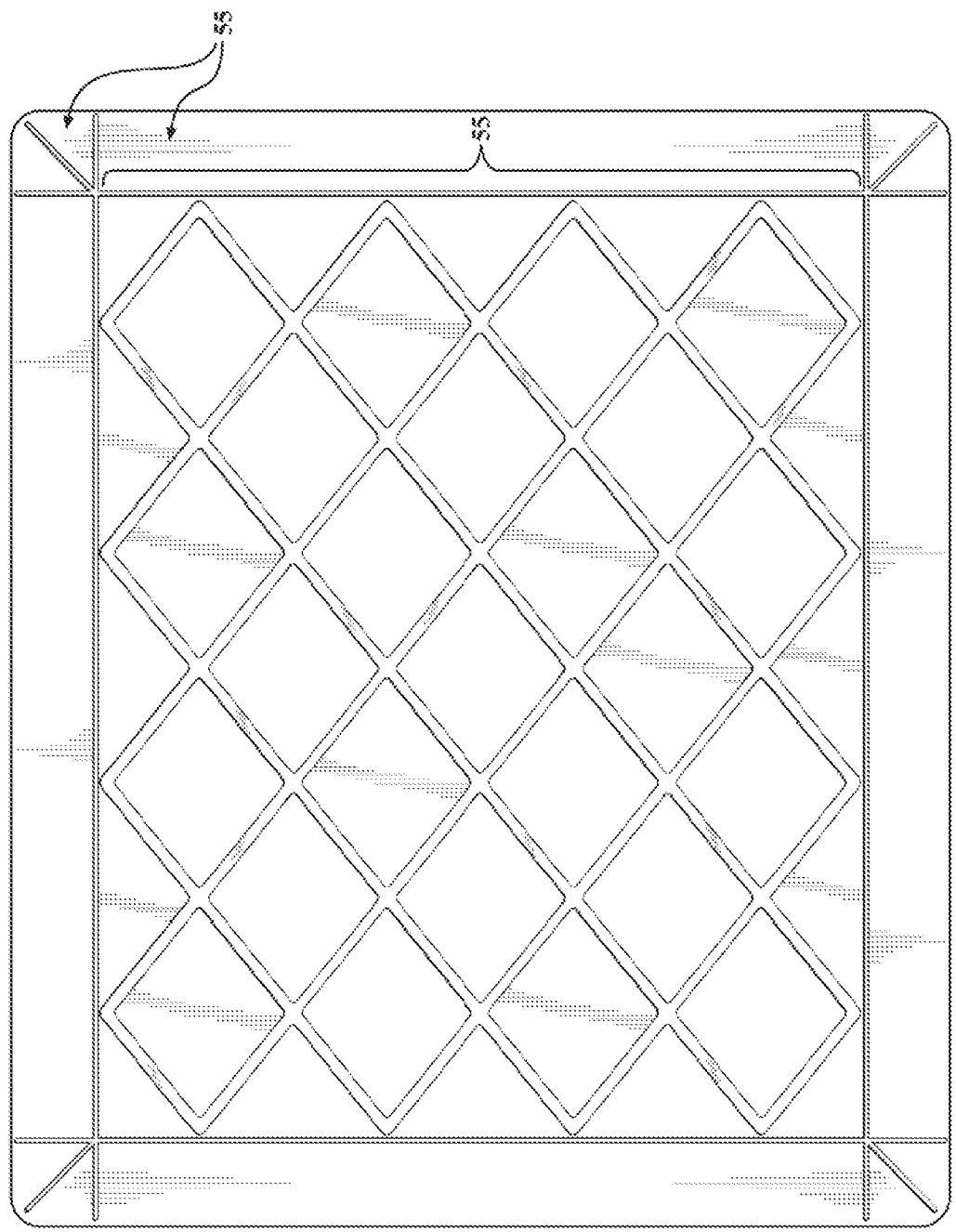
FIG. 14 shows an aerial view of the back, non-working surface of an embodiment of the disclosure in which the back of the embossed pattern with a plurality of embossed lines 21 and peripheral lines 20 of the disposable cutting board 19 are shown as depressed.

In certain embodiments, the plurality of embossed lines extend only within said inner cutting area. In certain embodiments, the entirety of said plurality of geometric shapes is entirely within said inner cutting area, as shown in FIGS. 1, 1A and 14. In these embodiments, the embossing of the embossed lines occurs only within the inner cutting area, and does not overlap the outer boarders or corners of the disposable cutting board. In these embodiments, incomplete embossed lines are not formed and there are no cut embossed lines.

Each of the plurality of repeating geometric shapes includes at least one acute angle. In certain embodiments, all of the repeating geometric shapes have the substantially the same, or the same, shape. In one embodiment, each of the plurality of geometric shapes includes two acute angles and two obtuse angles, forming a rhombus shape. A rhombus is known in the art to include two acute angles and two obtuse angles. The arrangement of the angles increase side-to-side/up-and-down slide resistance of an item being cut, for example, soft items such as meat, fish and poultry. The diminishing space between the intersecting embossed lines as the space approaches each acute angle or each obtuse angle creates a 'pinching' slide-resistant effect of the item's left/right and up/down movement over the embossed intersection lines. That is, the angles formed within each geometric shape create the decreasing dimensions of the sides of the geometric shapes such that the 'pinching' slide-resistant effect occurs.

The embossed lines 21 in various geometrical shapes that employ intersecting embossed patterns creates slide-resistance on the inner cutting area. The nature of the diminishing and expanding geometric shapes of embossed lines 21 creates slide-resistance of items 23 being cut. With a plurality of embossed lines 21 pointing in all directions, sufficient multi-directional slide-resistance of items 23 will be afforded providing safer user stability during the cutting process.

FIGS. 3A-3D illustrate how the pattern of the embossed lines 21 creates increased slide-resistance in any of four separate horizontal directions of an item on the cutting board 23 as the item is pushed into the decreasing dimensions inside the pattern's opposing embossed lines 21 that can be configured in a multitude of geometric shapes and sizes that employ a raised/embossed pattern. As shown, the sides of each geometric shape create a counter force, or resistance, to sliding of the item being cut.

Figure 4:
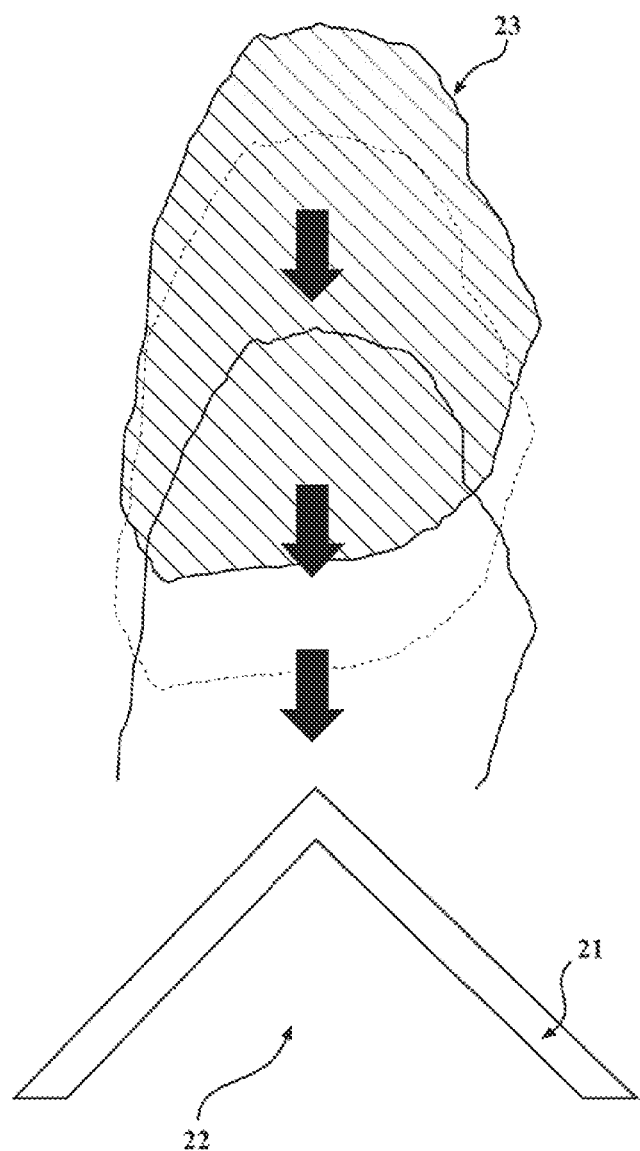
FIG. 4 illustrates how the embossed pattern of the embossed lines 21 also provide increased resistance of the item being cut 23 along the outside increasing dimensions of the embossed pattern.

FIG. 4 illustrates how the embossed pattern of the embossed lines 21 also provide increased resistance of the item being cut 23 along the outside increasing dimensions of the embossed pattern. As the item 23 being cut approaches one of embossed lines 21, the raised nature of the embossed lines 21 provide slide-resistance to the item 23 being cut.

Figure 5:
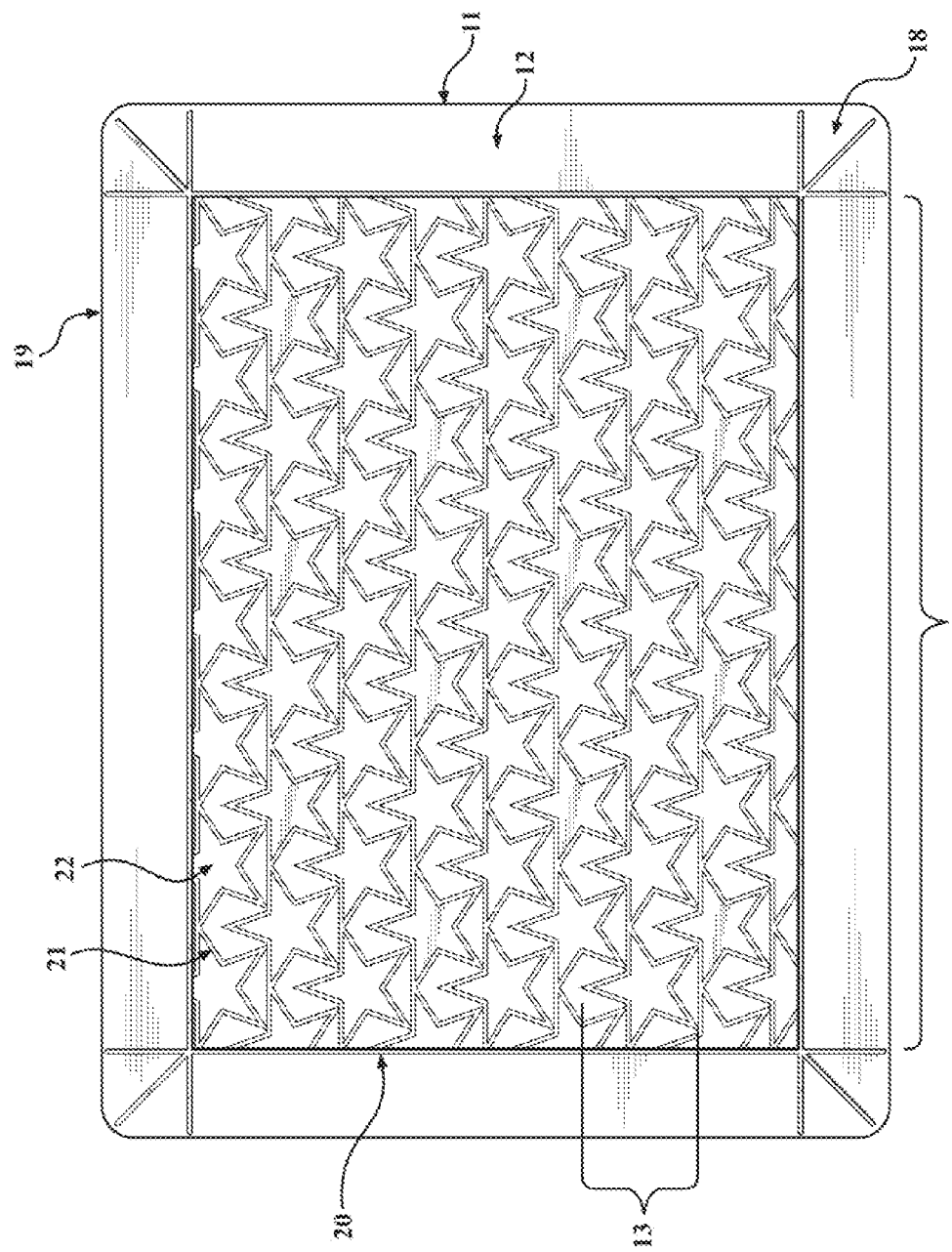
FIG. 5 shows another embodiment of the disposable cutting board 19 having different geometric shapes 13 than FIG. 1A, and also having of a plurality of embossed lines 21 and an enclosed depressed area 22.

FIG. 5 shows another embodiment of the disposable cutting board 19 having different geometric shapes 13 than FIG. 1A, and also having of a plurality of embossed lines 21 and an enclosed depressed area 22. FIG. 5 illustrates an example of how the cutting board 19 can employ a multiplicity of geometric shapes 13 using the embossed lines 21 that provide the slide-resistance while still providing the depressed area 22 that will contain fluids. For example, the geometric shapes 13 may be repeating star shapes.

Figure 6:
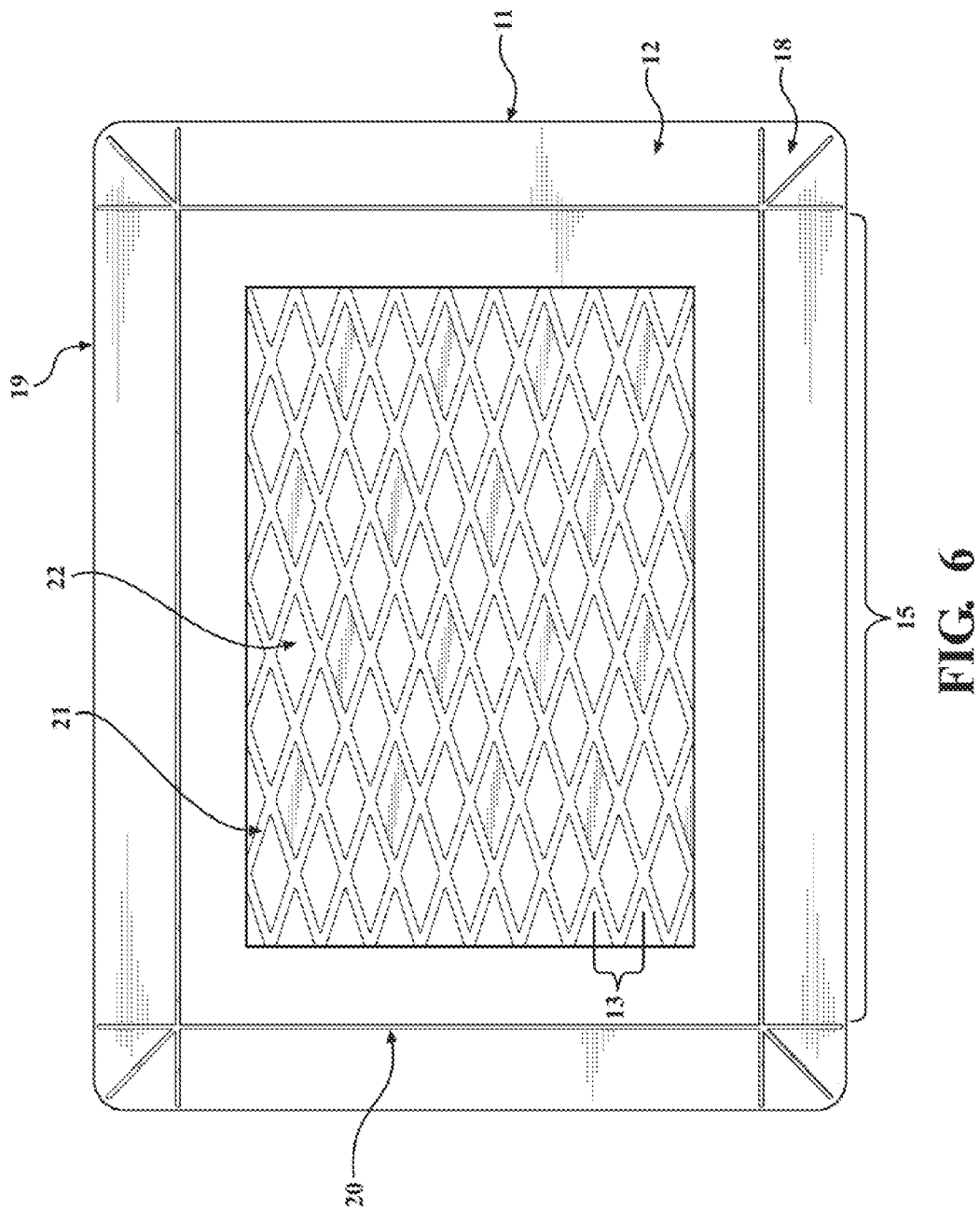
FIG. 6 shows another embodiment of the disposable cutting board 19 having different geometric shapes 13 than FIG. 1A, and also having of a plurality of embossed lines 21 and an enclosed depressed area 22.

FIG. 6 shows another embodiment of the disposable cutting board 19 having different geometric shapes 13 than FIG. 1A, and also having of a plurality of embossed lines 21 and an enclosed depressed area 22. FIG. 6 illustrates increased geometric surface coverage on the disposable cutting board 19 that provides the increased slide-resistances via the increased concentrated density of the embossed lines 21 and the depressed area 22 that contains fluids. For example, rhombus-shaped geometric shapes 13 are in a greater density than shown in FIG. 1A.

Figure 7:
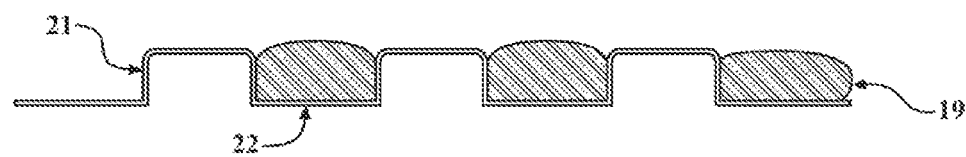
FIG. 7 is a cross-section of the embossed lines 21 and the depressed area 22 of disposable cutting board 19 where liquid 25 is passively contained within the embossed lines 21.

FIG. 7 is a cross-section of the embossed lines 21 and the depressed area 22 of disposable cutting board 19 where liquid 25 is contained within the embossed lines 21. The liquid 25 may be passively contained with the embossed lines 21. In certain embodiments, the liquid 25 does not cross over the embossed lines 21, that is, the liquid does not spill over to an adjacent depressed area 22.

Figure 8A:
FIGS. 8A-8D illustrates other embodiments of the embossed lines 21 and the opposing edges of the embossed lines 21.
Figure 8B:
Figure 8C:
Figure 8D:
Figure 9:
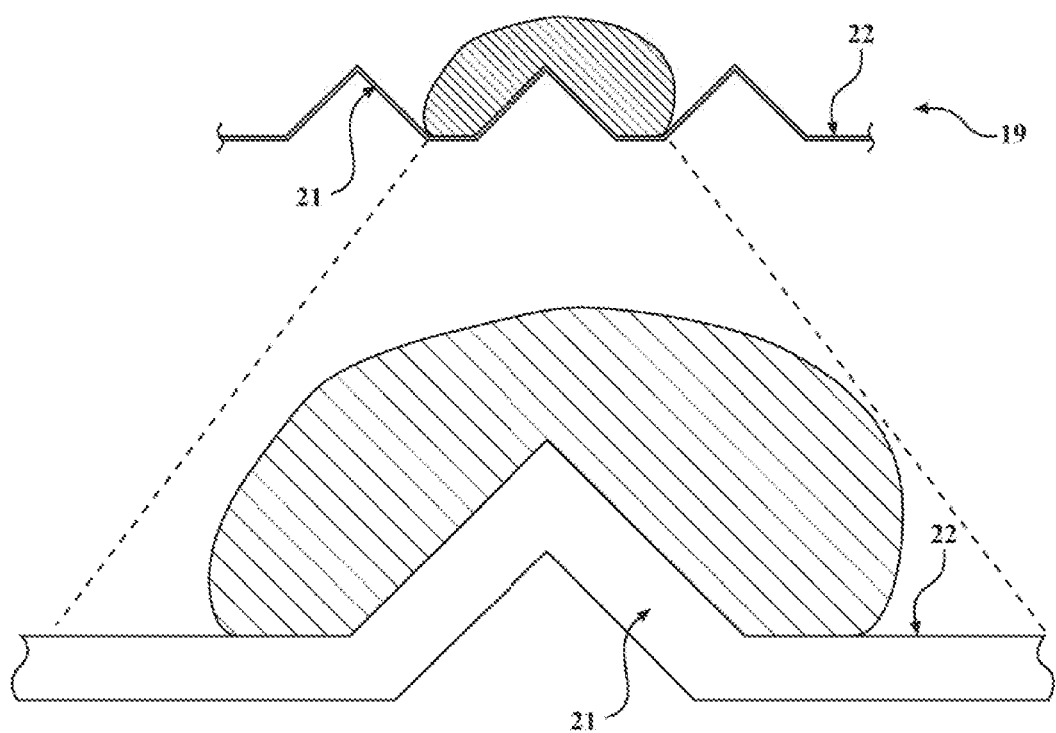
FIG. 9 is a cross-section of an embossed line 21 of the disposable cutting board 19.

FIG. 9 is a cross-section of an embossed line 21 of the disposable cutting board 19, specifically illustration "D" in FIG. 8 that shows a pyramid cross-section that also will provide vertical increased friction on an item placed downward on the embossed pyramid, thus creating an additional stabilizing force on the item being cut to augment the horizontal slip-resistance supplied by the diamond shaped surface embossing.

To further describe the 'pinching' slide-resistance effect, if raised embossed lines 21 were parallel and not intersecting to form repeating geometric shapes, the item being cut would slide freely in the direction of the embossed parallel lines as no 'pinching effect' would take place. Also, if the raised embossed lines were in the shape of an enclosed square or rectangle with all right-angle lines, the slide-resistance would be minimal and not provide the exponential side-to-side and up-and-down slide resistance that a, for example, rhombus shaped geometric shapes provided in an embossed pattern on the cutting area.

The Figures show rhombus shaped geometric patterns, as well as other patterns, that have non-right angle enclosed shapes, having at least one acute angle, with the same diminishing space between opposing embossed lines that will create the same exponential 'pinching' slide-resistant effect.

A depressed area 22 is present within each of said repeating geometric shapes. A depressed area may be enclosed within each of the plurality of geometric shapes. The depressed area 22 prevents liquid overflow. For example, the depressed area 22 prevents liquid accumulated in the depressed area 22 from spilling over into an adjacent depressed area. The depressed area also provides for passive fluid containment. For example, the depressed area 22 within each geometric shape provides multiple fluid containment areas to help prevent fluid run-off from items 22 from spilling off the edges of the disposable cutting board 19.

The depressed areas 22 provide interior, enclosed and independent 'pooling' space within the confines of each enclosed depressed area. In contrast, concave 'debossed' lines create more of a pattern of connected 'ditches' for fluid run-off across the entirety of the cutting surface with the potential for overflow 'flooding' of fluids that may converge if the surface on which the board is laying is not perfectly level. The independently enclosed depressed areas 22 eliminate the potential for fluid convergence and overflow flooding that would occur with the same amount of fluid present on concave 'ditch' debossed surfaces.

The depressed area 22, which may be enclosed, contains liquids and prevents fluid convergence inside each depressed area 22. This effect cannot be provided by connected, convex 'ditch' debossed grooves. A convex ditch will hold much less total liquid before spillover occurs.

The plurality of embossed lines 21 may have opposing sides that are parallel to each other and extend to a flat top or a flat surface. FIGS. 8A-8D illustrates other embodiments of the embossed lines 21 and the opposing edges of the embossed lines 21. A series of various cross-sectioned embossed line shapes 21 on the disposable cutting board 19 are shown where a multitude of embossed line 21 textures can be employed to achieve slide-resistance and fluid containment in the depressed areas 22 when arranged in a variety of geometric shapes 13 having at least one acute angle. For example, FIGS. 8(A) and (B) show embodiments where opposing sides of the embossed lines are parallel to each other and extend to a flat top. A flat top is formed connecting the opposing sides such that the flat top is parallel to the top surface 50 of the inner cutting area 15. In FIG. 8(A), the embossed lines 21 are angled with respect to the top surface 50 of the inner cutting area 15. In FIG. 8(B), the embossed lines 21 are perpendicular with respect to the top surface 50 of the inner cutting area 15.

In alternative embodiments, the plurality of embossed lines 21 has opposing sides that are transverse to each other. For example, FIGS. 8(C) and 8(D) show embodiments where opposing sides of the embossed lines are transverse to each other. As shown in FIG. 8(D), the opposing sides that are transverse to each other extend to a point of intersection to form a pyramid shape. As shown in FIG. 8(C), the opposing sides that are transverse to each other extend to a flat top to form a trapezoidal shape. Other embodiments contemplated by the disclosure include a reverse, or upside-down, trapezoidal shape formed by the opposing sides.

The flat top or surface is not rounded and is also not rounded at the edges of the embossed lines. Instead, the plurality of embossed lines have sharply angled side-to-top edges. For example, the sharply angled side-to-top edges are right angled side-to-top edges. Additional slide-resistance of the item or items being cut is provided by the flat top or surface and the sharply angled side-to-top edges. Additionally, the vertical pressure of the item being cut will be more acute on the top of the embossed lines than on the 'pool' bottom, thus creating more slide-resistance.

Figure 10:
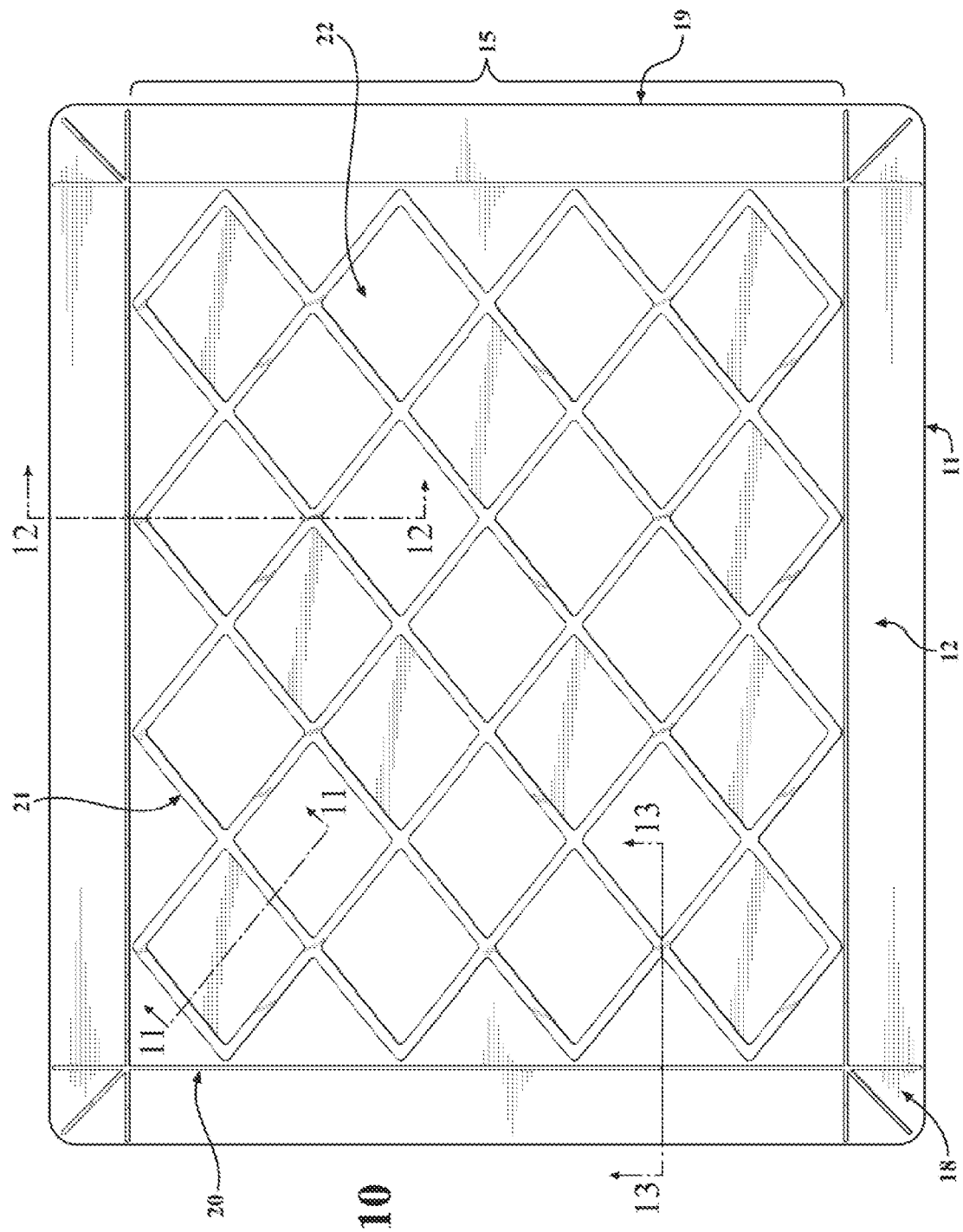
FIG. 10 shows an aerial view of the top, working surface of an embodiment of the disclosure in which the embossed pattern with a plurality of embossed lines 21 and peripheral lines 20 of the disposable cutting board 19 are shown as raised.

FIG. 11 shows a cross-sectional view of an embodiment of the disposable cutting board taken along lines 11-11 of FIG. 10, showing the paper 50 of the inner cutting area of the disposable cutting board 19 having a coating of plastic 51 thereon.

FIG. 12 shows a cross-sectional view of an embodiment of the disposable cutting board taken along lines 12-12 of FIG. 10, showing the paper 50 of the inner cutting area of the disposable cutting board 19 having a coating of plastic 51 thereon. As shown, peripheral line 20 is narrower having a smaller thickness than embossed line 21. Embossed lines 21 are shown as having sharply angled side-to-top edges. For example, right angled side-to-top edges are shown.

FIG. 13 shows a cross-sectional view of an embodiment of the disposable cutting board taken along lines 13-13 of FIG. 10, showing the paper 50 of the inner cutting area of the disposable cutting board 19 having a coating of plastic 51 thereon. Embossed lines 21 are shown as having sharply angled side-to-top edges. For example, right angled side-to-top edges are shown.

FIG. 14 shows an aerial view of the back, non-working surface of an embodiment of the disclosure in which the back of the embossed pattern with a plurality of embossed lines 21 and peripheral lines 20 of the disposable cutting board 19 are shown as depressed. In certain embodiments, the back of the disposable cutting board 19 is not used for cutting items 23 as the back, or back side, of the embossed lines 21 are 'ditches'.

The inner cutting area 15, the outer borders 12 and the corners 18 each having a top surface 50 and a bottom surface 55. In FIG. 14, the bottom surface 55 is shown as the backside of the entire board 19 including the backside, or bottom surface 55, of all of the inner cutting area 15, the outer borders 12 and the corners 18. A coating of plastic 51 is disposed on the top surface 50 of the inner cutting area 15, the outer borders 12 and the corners 18. That is, the coating of plastic is disposed on the homogeneous sheet of cut-resistant paper material. For example, this paper material is a homogenous sheet of Solid Bleached Sulfate paperboard material with typical thicknesses ranging from a minimum of 0.011" to 0.036". The material is semi-rigid, yet flexible and possesses cut-through resistance. The coating of plastic provides a sterile durable surface to prevent liquid absorption into said sheet of paper material and to reduce cross contamination. As shown in FIGS. 11-13, a coating of plastic 51 is shown as being disposed on the top surface 50 of the inner cutting area 15. The coating of plastic 51 is a layer on top surface 50 of the inner cutting area. The coating of plastic may be laminated on the embossed pattern of the plurality of embossed lines 21 with standard techniques known to those having ordinary skill in the art.

The inner cutting surface, the peripheral outer borders, and the corners are integrally formed of a single homogeneous sheet of material. This sheet of material is preferably made of a semi-rigid cut-resistant paper which may or may not itself be plastic coated. Specifically, the semi-rigid paper contemplated is an 18 point white paper which is commonly known in the art as bleach board. The coating of plastic 51 is a polyethylene coating applied to the paper during the milling process. For example, the disposable cutting board 19 is formed from a homogenous sheet of Solid Bleached Sulfate paperboard material with typical thicknesses ranging from a minimum of 0.011" to 0.036". The material is semi-rigid, yet flexible and possesses cut-through resistance. As appreciated by those skilled in the art, the specific type of material may be of any suitable design, type, thickness, or weight or have any suitable type of coating. Another suitable material could be recyclable plastic. Preferably, a number of cutting boards 19 would be sold in a single package, i.e., a 10-pack or 20-pack. In addition, the cutting boards 19 may be sold in pads like writing pads, or the like, and detached from the pad one at a time.

Additionally, a plurality of peripheral lines 20 separating at least a portion of the outer borders 12 from the inner cutting surface 15 may be included in the assembly. In certain embodiments, a plurality of peripheral lines 20 completely and wholly separate at least a portion of the outer borders 12 from the inner cutting surface 15, as shown in FIGS. 1A, 1B, 2 and 10.

The embossed lines 21 may extend up to the plurality of peripheral lines 20. In certain embodiments, the embossed lines 21 do not cross or intersect with the peripheral lines 21.

In certain embodiments, a width of said plurality of embossed lines between opposing sides of the embossed lines is greater than the width of the peripheral lines. In certain embodiments, the peripheral lines are also embossed. The peripheral lines may be embossed at the same time that the plurality of embossed lines 21 are embossed.

The embossed pattern including the plurality of embossed lines is formed by stamping said embossed pattern into the homogeneous sheet of cut-resistant paper material. The stamping technique may be any of those known to those of ordinary skill in the art. The embossed pattern is not made by a rolling technique.

In certain embodiments, the plurality of embossed lines are embossed or stamped into the paper material such that the height of the plurality of embossed lines 21 is from about 0.002 inches to about 0.024 inches so as to not compromise the integrity of the homogeneous sheet of cut-resistant paper material coated with plastic, such as paper coated with polyethylene. In certain embodiments, the height is from 0.002 to 0.024, 0.005 to 0.024, 0.005 to 0.020, 0.010 to 0.024, 0.010 to 0.020, 0.010 to 0.015, 0.005 to 0.015 inches, or any height therebetween. The height is measured from the top surface 50 including the coating of plastic 51 extending upward in a perpendicular direction to the top surface of the embossed lines 21. In preferred embodiments, the height is a substantially uniform thickness. In certain embodiments, the plurality of embossed lines are embossed or stamped into the paper material such that the width of the plurality of embossed lines 21 is from about 0.0625 inches to about 0.25 inches so as to not compromise the integrity of the homogeneous sheet of cut-resistant paper material coated with plastic, such as paper coated with polyethylene. In certain embodiments, the width is from 0.0625 to 0.25, 0.08 to 0.25, 0.10 to 0.25, 0.10 to 0.20, 0.10 to 0.15, 0.08 to 0.20, 0.08 to 0.15 inches, or any height therebetween. The width is measured between the opposing sides of any embossed line 21. The width is measured across the top surface 50 extending in a parallel direction to the top 50. In preferred embodiments, the width is a substantially uniform thickness.

The peripheral lines 20 separate the corners 18 from the outer borders 12 and the inner cutting surface 15. In other words, each of the peripheral lines 20 extends along the entire length of the cutting board 19. Specifically, the peripheral lines 20 extend substantially parallel with the exterior edge 11 of the outer borders 12 such that the outer borders 12 have a substantially uniform width. Preferably, the corners 18 interconnect the outer borders 12. Each of the corners 18 include a curved exterior edge. A corner score line may extend from the inner cutting surface 15 through a center of each of the corners 18 to the curved exterior edge.

In one embodiment, the inner cutting surface 15 is substantially rectangular. The outer borders 12 extend along each side of the substantially rectangular inner cutting surface 15 such that the outer borders 12 are also substantially rectangular. This configuration creates four outer borders 12 and four adjacent corners 18. As appreciated by those of ordinary skill in the art, the cutting surface 15 and/or outer borders 12 may be of any suitable design or configuration. Further, there may be any number of outer borders 12 and corners 18 as necessary to surround the inner cutting surface 15.

U.S. Pat. No. 6,164,478 is hereby incorporated herein by reference in its entirety. As described in U.S. Pat. No. 6,164,478, the outer borders 12 and the corners 18 are foldable between a first position with the outer borders 12 and the corners 18 in a substantially horizontal position and a second position with the outer borders 12 and the corners 18 in a substantially vertical position to create an impervious and continuous exterior wall surrounding the inner cutting surface 15. In other words, the inner cutting surface 15, outer borders 12, and corners 18 create a transport tray (not shown). The impervious exterior wall creates a containment area such that any product or liquids are maintained on the inner cutting surface 15. This is especially useful during the movement of the transport tray. The specific folding operations will be discussed in greater detail herein below.

The method of creating the transport tray (not shown) from the disposable cutting board 19 is described. As discussed above, the cutting board 19 has an inner cutting surface 15, a plurality of outer borders 12, a plurality of corners 18, and a plurality of peripheral lines 20 separating the inner cutting surface 15 from each of the adjacent outer borders 12. The manipulating of the corner 18 is further defined as folding the corner 18 along an adjacent peripheral line 20. Specifically, the corner 18 is simultaneously folded along a corner score line and the adjacent peripheral lines 20. As appreciated, the steps of folding the outer borders 12 and the corners 18 may be accomplished in any order or any manner without deviating from the scope of the disclosure.

The manipulation of the corner 18 is further defined as abutting the corner 18 against an inside surface of one of the first or second outer borders 12 when the first or second outer border 12 is in the substantially vertical position thereby forming the upstanding wall section created by the first and second outer borders 12 and the adjacent corner 18. The corner 18 is folded inwardly toward the inner cutting surface 15. This particular design is preferred because the corner 18 is disposed within the interior of the transport tray (not shown) which assists in retaining any food product and/or liquids within the inner cutting surface 15.

As anticipated, a user will typically fold each corner 18 in turn after the outer borders 12 have been folded. In other words, a user may fold two of the outer borders 12 and then fold the adjacent corner 18. The user may then fold the other two outer borders 12 and then fold the remaining three corners 18 to complete the transport tray. As discussed above, the user may fold the outer borders 12 and corners 18 in any desired order or fashion so long as the outer borders 12 and corners 18 are substantially vertical.

This disclosure augments the a disposable cutting board assembly by including embossed lines configured in a plurality of enclosed geometric shapes with intersecting outlines on the cutting surface of the disposable cutting board to create slide-resistance in four horizontal directions on the cutting surface and fluid containment inside the various geometric shapes that will enhance user safety by creating slide-resistance of items being cut as well as assisting in fluid run-off containment.

Additionally, when the embossed lines are pyramid shaped in the cross-section, the slide-resistance is further augmented from the increased vertical friction provided when the item being cut is placed downward on the pyramid angled sides of the embossed lines. The friction slide resistance increases exponentially when the item being cut spans a multiplicity of the embossed lines.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

The invention claimed is:

1. A disposable cutting board assembly comprising:
    a homogenous sheet of cut-resistant paper material having an inner cutting area;
    a plurality of peripheral outer borders and a plurality of corners extending from said inner cutting area to a continuous exterior edge;
    said inner cutting area, said outer borders and said corners each having a top surface and a bottom surface; and
    a coating of plastic disposed on said top surface of said inner cutting area, said outer borders and said corners of said homogeneous sheet of paper material for providing a sterile durable surface to prevent liquid absorption into said sheet of paper material and to reduce cross contamination;
    an embossed pattern within said inner cutting area, with said embossed pattern including a plurality of embossed lines that intersect to form a plurality of repeating geometric shapes, each of said plurality of repeating geometric shapes forming a rhombus shape, wherein, within said inner cutting area, said plurality of repeating geometric shapes is surrounded by a plurality of triangle shapes formed by intersection of some of said plurality of embossed lines;
    a depressed area within each of said repeating geometric shapes to prevent liquid overflow, and
    wherein each of said plurality of embossed lines has opposing sides that are parallel to each other and extend to a flat top.

2. The disposable cutting board assembly of claim 1, wherein the depressed area is enclosed within said geometric shape.

3. The disposable cutting board assembly of claim 1, further comprising a plurality of peripheral lines separating at least a portion of said outer borders from said inner cutting area.

4. The disposable cutting board assembly of claim 3, wherein said plurality of peripheral lines completely separate said outer borders from said inner cutting area.

5. The disposable cutting board assembly of claim 3, wherein a width of said plurality of embossed lines between said opposing sides is greater than the width of the peripheral lines.

6. The disposable cutting board assembly of claim 3, wherein said plurality of embossed lines extend only within said inner cutting area.

7. The disposable cutting board assembly of claim 1, wherein the entirety of said plurality of geometric shapes is entirely within said inner cutting area.

8. The disposable cutting board assembly of claim 1, wherein said inner cutting area is substantially rectangular.

9. The disposable cutting board assembly of claim 1, wherein a height of said plurality of embossed lines is from about 0.002 inches to about 0.024 inches.

10. The disposable cutting board assembly of claim 9, wherein the height is a substantially uniform thickness.

11. The disposable cutting board assembly of claim 1, wherein a width of each of said plurality of embossed lines is between about 0.0625 inches to about 0.25 inches.

12. The disposable cutting board assembly of claim 11, wherein the width is substantially uniform.

13. The disposable cutting board assembly of claim 1, wherein said embossed pattern is formed by stamping said embossed pattern into said homogeneous sheet of cut-resistant paper material.

14. The disposable cutting board assembly of claim 1, wherein said coating of plastic extends over said top surfaces and terminates at said exterior edge such that said top surfaces and said coating are co-extensive to maintain said bottom surfaces and said exterior edge free of said coating.

15. The disposable cutting board assembly of claim 1, wherein said outer borders and said corners are foldable between a first position with said outer borders and said corners in a substantially horizontal position and a second position with said outer borders and said corners in a substantially vertical position to create an impervious and continuous exterior wall surrounding said inner cutting area with said continuous exterior edge defining a top of said continuous exterior wall and wherein said borders and said corners are configured to be unfolded to return to said first position.

16. A disposable cutting board assembly comprising:
a homogenous sheet of cut-resistant paper material having an inner cutting area;
a plurality of peripheral outer borders and a plurality of corners extending from said inner cutting area to a continuous exterior edge;
said inner cutting area, said outer borders and said corners each having a top surface and a bottom surface; and
a coating of plastic disposed on said top surface of said inner cutting area, said outer borders and said corners of said homogeneous sheet of paper material for providing a sterile durable surface to prevent liquid absorption into said sheet of paper material and to reduce cross contamination;
an embossed pattern within said inner cutting area, with said embossed pattern including a plurality of embossed lines that intersect to form a plurality of repeating geometric shapes, each of said plurality of repeating geometric shapes forming a rhombus shape, wherein, within said inner cutting area, said plurality of repeating geometric shapes is surrounded by a plurality of triangle shapes formed by intersection of some of said plurality of embossed lines;
a depressed area within each of said repeating geometric shapes to prevent liquid overflow, and
wherein each of said plurality of embossed lines has opposing sides that are transverse to each other.

17. The disposable cutting board of claim 16, wherein said opposing sides that are transverse to each other extend to a point of intersection to form a pyramid shape.

18. The disposable cutting board of claim 16, wherein said opposing sides that are transverse to each other extend to a flat top to form a trapezoidal shape.

* * * * *